(12) United States Patent
Walton et al.

(10) Patent No.: US 7,995,867 B2
(45) Date of Patent: Aug. 9, 2011

(54) IMAGE PROCESSOR AND METHOD OF IMAGE ROTATION

(75) Inventors: Derek T. Walton, Bolton, MA (US); Jim Duda, Waltham, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 13/011,669

(22) Filed: Jan. 21, 2011

(65) Prior Publication Data

US 2011/0110607 A1     May 12, 2011

Related U.S. Application Data (63) Continuation of application No. 11/703,068, filed on Feb. 6, 2007, now Pat. No. 7,876,977.

(60) Provisional application No. 60/773,522, filed on Feb. 15, 2006.

(51) Int. Cl.
*G06K 9/32* (2006.01)

(52) U.S. Cl. ........ 382/296; 382/289; 382/291; 358/537; 358/538

(58) Field of Classification Search .................. 382/284, 382/289, 291, 296; 358/537, 538, 401
See application file for complete search history.

(56) References Cited

U.S. PATENT DOCUMENTS

| | | | |
|---|---|---|---|
| 4,168,488 A | 9/1979 | Evans | |
| 4,627,020 A | 12/1986 | Anderson et al. | |
| 4,837,845 A | 6/1989 | Pruett et al. | |
| 4,891,768 A | 1/1990 | Willems et al. | |
| 4,891,771 A | 1/1990 | Edel et al. | |
| 5,067,167 A | 11/1991 | Berger | |
| 5,379,127 A | 1/1995 | Ando | |
| 5,479,525 A | 12/1995 | Nakamura et al. | |
| 5,517,587 A | 5/1996 | Baker et al. | |
| 5,598,181 A | 1/1997 | Kermisch | |
| 5,670,982 A | 9/1997 | Zhao | |
| 5,734,875 A | 3/1998 | Cheng | |
| 5,751,865 A | 5/1998 | Micco et al. | |
| 5,912,995 A | 6/1999 | He | |
| 5,973,661 A | 10/1999 | Kobayashi et al. | |
| 5,986,672 A | 11/1999 | Groezinger et al. | |
| 6,055,326 A | 4/2000 | Chang et al. | |
| 6,104,843 A | 8/2000 | Nakashima | |
| 6,273,606 B1 | 8/2001 | Dewaele et al. | |
| 6,310,986 B2 | 10/2001 | Robey et al. | |
| 6,353,682 B2 | 3/2002 | Klassen | |
| 6,400,851 B1 | 6/2002 | Shih | |
| 6,496,560 B1 | 12/2002 | Lin et al. | |
| 6,546,220 B1 | 4/2003 | Asakura et al. | |

(Continued)

*Primary Examiner* — Yosef Kassa (74) *Attorney, Agent, or Firm* — John R. Thompson; Stoel Rives LLP

(57) ABSTRACT

A method of rotating a digital image includes performing a first pass to process a selected image tile of a source image. The first pass includes copying a set of pixels of the selected image tile from a first memory to a processor memory, where the set of pixels comprises a portion of the selected image tile. The first pass further includes grouping the set of pixels into blocks of pixels and writing each of the blocks of pixels to a memory location. The method further includes repeating the first pass until each of the pixels of the selected image tile is processed, performing a second pass to process the blocks of pixels, and repeating the second pass until each of the blocks of pixels is processed. The second pass includes copying blocks of pixels, regrouping the blocks of pixels, and writing the regrouped pixels to a destination image location.

23 Claims, 7 Drawing Sheets

U.S. PATENT DOCUMENTS

| | | |
|---|---|---|
| 6,640,002 B1 | 10/2003 | Kawada |
| RE38,471 E | 3/2004 | Howard et al. |
| 6,735,337 B2 | 5/2004 | Lee et al. |
| 6,757,080 B1 | 6/2004 | Kondoh |
| 6,813,010 B2 * | 11/2004 | Kono et al. .................. 356/71 |
| 6,919,892 B1 * | 7/2005 | Cheiky et al. ................ 345/473 |
| 7,003,037 B1 * | 2/2006 | Bordes et al. ............ 375/240.16 |
| 7,006,881 B1 * | 2/2006 | Hoffberg et al. ................ 700/83 |
| 7,128,270 B2 * | 10/2006 | Silverbrook et al. .... 235/472.01 |
| 7,444,003 B2 * | 10/2008 | Laumeyer et al. ............ 382/103 |
| 7,612,875 B2 * | 11/2009 | Kono et al. .................... 356/71 |
| 2005/0073695 A1 | 4/2005 | Nacman et al. |
| 2005/0152197 A1 | 7/2005 | Cho et al. |

* cited by examiner

IMAGE PROCESSOR AND METHOD OF IMAGE ROTATION

CROSS-REFERENCE TO RELATED APPLICATION(S)

This application is a continuation application that claims priority from U.S. U.S. patent application Ser. No. 11/703,068, filed on Feb. 6, 2007, and entitled "IMAGE PROCESSOR AND METHOD OF IMAGE ROTATION," which claims priority from U.S. Provisional Patent Application No. 60/773,522, filed on Feb. 15, 2006, and entitled "METHOD AND SYSTEM FOR IMAGE ROTATION," which are each incorporated herein by reference in their entirety.

FIELD OF THE DISCLOSURE

The present disclosure generally relates to image processing, and more particularly to image processors and methods for rotating an image.

BACKGROUND

Rotating an image by 90, 180, or 270 degrees with respect to its original orientation is a common operation for data processing systems, including printers, computers, digital cameras, mobile telephones with image capabilities, personal digital assistants (PDAs), and other image processing systems. Typically, pixels are read into a data processing system in a first orientation (for example, a horizontal orientation), and the pixels are written out of the data processor in a second orientation (for example, a vertical orientation).

In many cases, a digital image to be rotated is stored in a memory that is accessible to an image processor, and the desired output of an image rotation process performed by the image processor is a rotated digital image that is stored in the same memory. A process of rotating the digital image may include copying pixels from a source image location within the memory to a destination image location within the memory in a manner that achieves the desired rotation. Thus, the speed with which the rotated image can be created depends on the speed with which pixels can be read from the source image and written to the destination image.

One approach to creating the rotated destination image includes copying pixels from the source image to the destination image, one pixel at a time. In this pixel-by-pixel rotation process, the image processor reads a pixel from the source image and writes the pixel to the appropriate location within the destination image. The image processor may iteratively perform the read and write operations until each pixel of the source image has been written to the destination image. An advantage of this approach is that a memory associated with the image processor can be sized to store only a single pixel of the source image. However, by reading and writing one pixel at a time, such an approach does not take advantage of memory efficiencies associated with reading or writing consecutive address locations.

Images are typically stored in memory in a particular arrangement of data bits, which places horizontally adjacent pixel data associated with the image in consecutive address locations within the memory. A rotation technique can obtain improved memory access efficiencies by reading and writing groups of adjacent pixels within the same image row using consecutive memory addresses, rather than accessing non-adjacent memory locations.

For example, a particular rotation technique for a 90-degree clockwise rotation may read a group of 16 horizontally adjacent pixels from a row of the source image and write the pixels to appropriate locations in the destination image. The read operation may be performed efficiently to access adjacent memory locations; however, the pixels are rotated into vertically adjacent locations in the destination image. Writing pixel data to the vertically adjacent locations in the destination image uses 16 separate write operations to non-consecutive locations. While this technique is more efficient than the pixel-by-pixel rotation process, the 16-pixel technique uses more memory space within the image processor.

In general, the term cache line may be used to represent a set of consecutive memory reads or writes which can be grouped together to obtain efficient memory access. There is a tradeoff between efficiency in terms of memory accesses used to rotate an image and the amount of memory within the image processor that can be used to store the pixels that are being rotated. Hence, there is a need for improved image rotation methods and systems.

DETAILED DESCRIPTION OF THE DRAWINGS

An image processor and image rotation methods are disclosed that may be used to rotate an image using a multi-pass technique. As used herein, a multi-pass technique refers to an image rotation technique where an image processor iteratively processes sets of pixels associated with image tiles of a source image to rotate the source image relative to an original orientation. In a particular embodiment, the image processor may read pixels from a selected image tile of a source image at an external memory, may regroup the pixels, and may write the pixels to one of a temporary memory location or a destination image location at the external memory via an iterative process.

In a particular illustrative embodiment, a method is provided to rotate a source image 90 degrees in two passes. In a first pass, the method includes copying sets of pixels of a source image tile from an external memory to a processor memory, regrouping the sets of pixels, and writing the regrouped sets of pixels to a memory location in the external memory. In a second (final) pass, the method includes copying the regrouped sets of pixels from the memory location to the processor memory, regrouping the regrouped sets of pixels to form new blocks of pixels, and writing the new blocks of pixels to a destination image tile in a destination image location of the external memory. In an illustrative embodiment, the blocks of pixels written to the destination image tile represent rows of pixels destination image tile that is rotated 90 degrees with respect to an original orientation of the source image.

In a particular embodiment, a method of rotating a digital image is disclosed that includes performing a first pass to process a selected image tile of a source image. The source image may include multiple image tiles, and each image tile may include a plurality of pixels. The first pass includes copying a set of pixels of the selected image tile from a first memory to a processor memory, where the set of pixels includes a portion of the selected image tile. The first pass further includes grouping the set of pixels into blocks of pixels and writing each of the blocks of pixels to a memory location. The method further includes repeating the first pass until each of the pixels of the selected image tile is processed. The method also includes performing a second pass to process the blocks of pixels and repeating the second pass until each pixel of the blocks of pixels at the memory location is processed. The second pass includes copying selected blocks of pixels from the memory location, regrouping the selected blocks of pixels to form regrouped blocks of pixels, and writing the regrouped blocks of pixels to a destination image tile at a destination image location.

In another embodiment, an image processor includes a processor memory and a processing unit having access to the processor memory. The processor memory stores pixels of a selected image tile of a source image comprising a plurality of image tiles. The processing unit performs at least two passes to rotate the source image tile, including a first pass and a second pass. The first pass is to copy a set of pixels of the source image tile from a memory to the processor memory, to group the set of pixels into blocks of pixels, to write each block of pixels to a memory location, and to repeat the first pass until each pixel of the selected image tile is written to the memory location. The second pass is to copy selected blocks of pixels from the memory location to the processor memory, to regroup the selected blocks of pixels to form new blocks of pixels, to write the new blocks of pixels to a destination image location, and to repeat the second pass until each pixel of the blocks of pixels is written to the destination image location.

In another embodiment, a method of rotating an image includes defining an array of tiles from a source image at a memory, where each tile in the array of tiles includes a plurality of pixels associated with the source image. The method further includes processing a selected tile of the array of tiles via a first pass and a second pass to produce a rotated tile, each pass including multiple copy operations, multiple regroup operations, and multiple write operations related to the plurality of pixels.

In still another particular embodiment, a processor readable medium embodying processor readable instructions to rotate a source image relative to an original orientation is disclosed. The processor readable instructions include an instruction set embodied in the processor readable medium that performs a first pass operation including copying cache lines of a source image tile of a source image from a memory to a processor memory, grouping pixels of the cache lines into blocks of pixels, and writing each of the blocks of pixels to a memory location. The instruction set further includes instructions to repeat the first pass operation until each pixel of the source image is written. The instruction set also includes instructions to perform a second pass operation including copying selected blocks of pixels from the memory location, regrouping the selected blocks of pixels to form new blocks of pixels, and writing the new blocks of pixels to a destination image location. The instruction set also includes instructions to repeat the second pass operation until each pixel of the blocks of pixels of the memory location is written.

Figure 1:
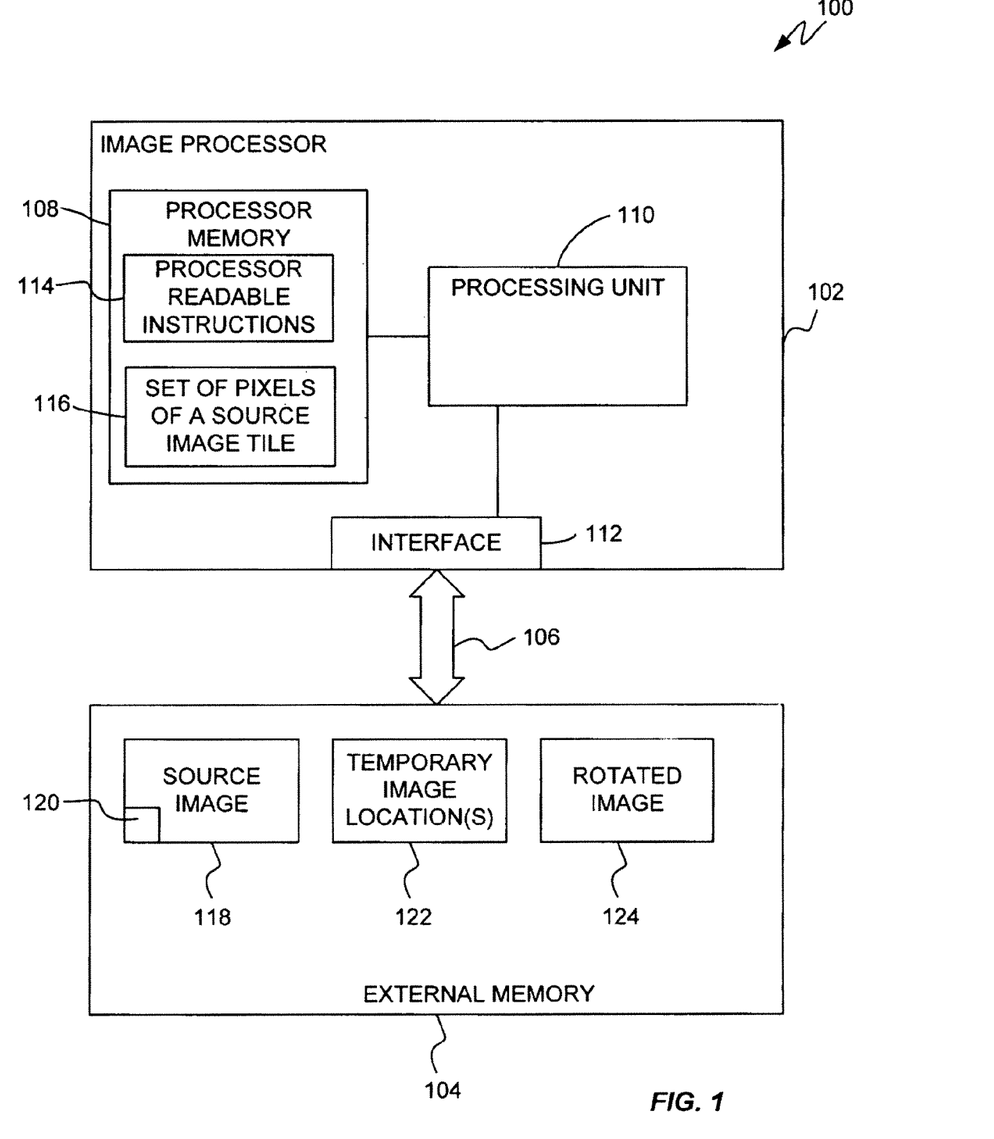
FIG. 1 is a block diagram of a particular embodiment of a multi-pass system for image rotation.

FIG. 1 is a block diagram of a particular embodiment of a multi-pass system 100 for image rotation. The system 100 includes a processor 102 connected to an external memory 104 via a memory bus 106. The processor 102 includes a processor memory 108, a processing unit 110, and an interface 112. The processor memory 108 may be internal random access memory (RAM), flash memory, or other appropriate memory. The processor memory 108 may include processor readable instructions 114 to define and control operations to be performed by the processor 102. The processor memory 108 may also include a set of pixels of a source image tile 116 on which the processing unit 110 is operating. The processing unit 110 may be coupled to the processor memory 108 and the interface 112. The interface 112 may be coupled to the memory bus 106.

The external memory 104 includes a source image 118, which may be fragmented into a plurality of source image tiles, such as the source image tile 120. The external memory 104 may also include one or more temporary image locations 122 and a rotated image 124. In a particular illustrative embodiment, each of the one or more temporary image locations 122 may have a size that is approximately equal to a size of a source image tile. In a particular embodiment, the one or more temporary image locations 122 may identify a portion of the external memory 104 in which partially rotated image data is stored, that is different from a memory area of the external memory 104 where the source image 118 is stored. In an alternative embodiment, the partially rotated image tile data may be stored in another memory location, such as a random access memory (RAM), a flash memory, another memory, or any combination thereof.

In a particular illustrative embodiment, in a first pass, the image processor 102 accesses the source image 118 of the external memory 104 via the interface 112 and the memory bus 106 to read sets of cache lines of a source image tile 120 into the processor memory 108. The processing unit 110 partially rotates the sets of cache lines and writes the partially rotated sets of cache lines to a selected temporary image location of the one or more temporary image locations 122 of the external memory 104. In an intermediate pass, the image processor 102 may access the partially rotated sets of cache lines from the selected temporary image location of the one or more temporary image locations 122 of the external memory 104 to read the sets of cache lines into the processor memory 108. The processing unit 110 may perform the partial rotation process on the sets of cache lines and write the partially rotated sets of cache lines to another temporary image location of the one or more temporary image locations 122 of the external memory 102. The image processor 102 may repeat the intermediate pass multiple times. In a final pass, the image processor 102 may access the partially rotated sets of cache lines to read the sets of cache lines into the processor memory 108. The processing unit 110 may perform the partial rotation process on the sets of cache lines, determine that the sets of cache lines are in a desired form (i.e. each cache line represents a column of source pixels), and write the sets of cache lines to a destination tile in the rotated (destination) image location 124 of the external memory 104. Additionally, the image processor 102 may access a next source image tile of the source image 118 and repeat the multi-pass rotation process until each tile of the source image tile is rotated.

In a particular illustrative embodiment, the image processor 102 may be adapted to fracture or segment the source image 118 into a plurality of source image tiles, where each source image tile (e.g. the source image tile 120) is a square block or a rectangular block of pixels with width and height that is related to a cache line size of the external memory 104. For example, if the external memory 104 has a cache line size of 32 pixels, the image processor 102 may divide the source image 118 into a plurality of 32×32 pixel source image tiles (or 32>64, 64×32, 64×64, etc. pixel source image tiles). If the external memory 104 has a cache line size of 16-pixels, the image processor 102 may divide the source image 118 into a plurality of 16×16-pixel source image tiles (or 16×32, 32×16, 32×32, etc. pixel source image tiles). In general, a cache line size is related to a set of consecutive memory locations, which a memory subsystem of the external memory 104 may access with a desired efficiency.

In a an alternative embodiment, the image processor 102 may be adapted to segment or fracture the source image 118 into a plurality of source image tiles, such as the source image tile 120. The source image tile 120 may be a square block or a rectangular block of pixels, where the width and height of the source image tile 120 is a multiple of the memory bus width, for example. If the source image does not divide evenly, the image processor 102 may pad the image tiles along one or more edges of the source image with null data to make the image tiles along the one or more edges square. If the memory bus 106 is 32-pixels wide, the image processor 102 may divide the source image 118 into a plurality of 32×32-pixel source image tiles. Alternatively, the source image tiles may be divided into other sizes of image tiles, such as 32×64, 64×32, 64×64, or another matrix of pixels. If the memory bus 106 is 16-pixels wide, the image processor 102 may divide the source image 118 into a plurality of 16×16-pixels source image tiles. Alternatively, the image processor 102 may divide the source image into other sizes of image tiles, such as 16×32, 32×16, 32×32, or another matrix of pixels.

In a particular illustrative embodiment, the processor memory 108 may be ¼th the size of a source image tile 120 of the source image 118. For example, the source image tile 120 may be a 16×16 pixel tile (e.g. 256 pixels) and the processor memory 108 may be sized to hold 64 pixels, such as four 1×16-pixel cache lines. In a first pass, the image processor 102 may read four 1×16-pixel cache lines into the processor memory 108. The image processor 102 may then regroup the four 16-pixel cache lines into four 4×4 pixel blocks and write each 4×4 pixel block as partially rotated cache lines to a selected image location of the one or more temporary image locations 122 of the external memory 104. The image processor 102 may be adapted to perform this process iteratively on sets of cache lines of the source image tile until all of the cache lines of the source image tile have been partially rotated and written to the selected image location. The image processor 102 may then read in the partially rotated cache lines to form a 16×4 block of data. The image processor 102 may regroup the 16×4 block of data into four 16×1 blocks of data, and write each 16×1 block of data to a respective cache line of the rotated (destination) image 124. The image processor 102 may be adapted to perform this process iteratively on sets of cache lines of each source image tile and on each tile of the source image 118 until the source image 118 is rotated relative to an original orientation. In a particular embodiment, the source image 118 may be rotated by 90 degrees.

It should be understood that the number of cache lines read into the processor memory 108 determines the number of blocks into which the cache lines are divided. For example, if two cache lines are read in, then the cache lines are regrouped into two pixel blocks. If four cache lines are read in, then the cache lines are regrouped into four pixel blocks, and so on. The number of cache lines is determined by the processor memory size relative to a size of the cache line. In one embodiment, the memory size of the processor memory 108 is chosen to be a power of two fraction (e.g. ½, ¼, ⅛, and so on) of the size of the source image tile 120.

Figure 2:
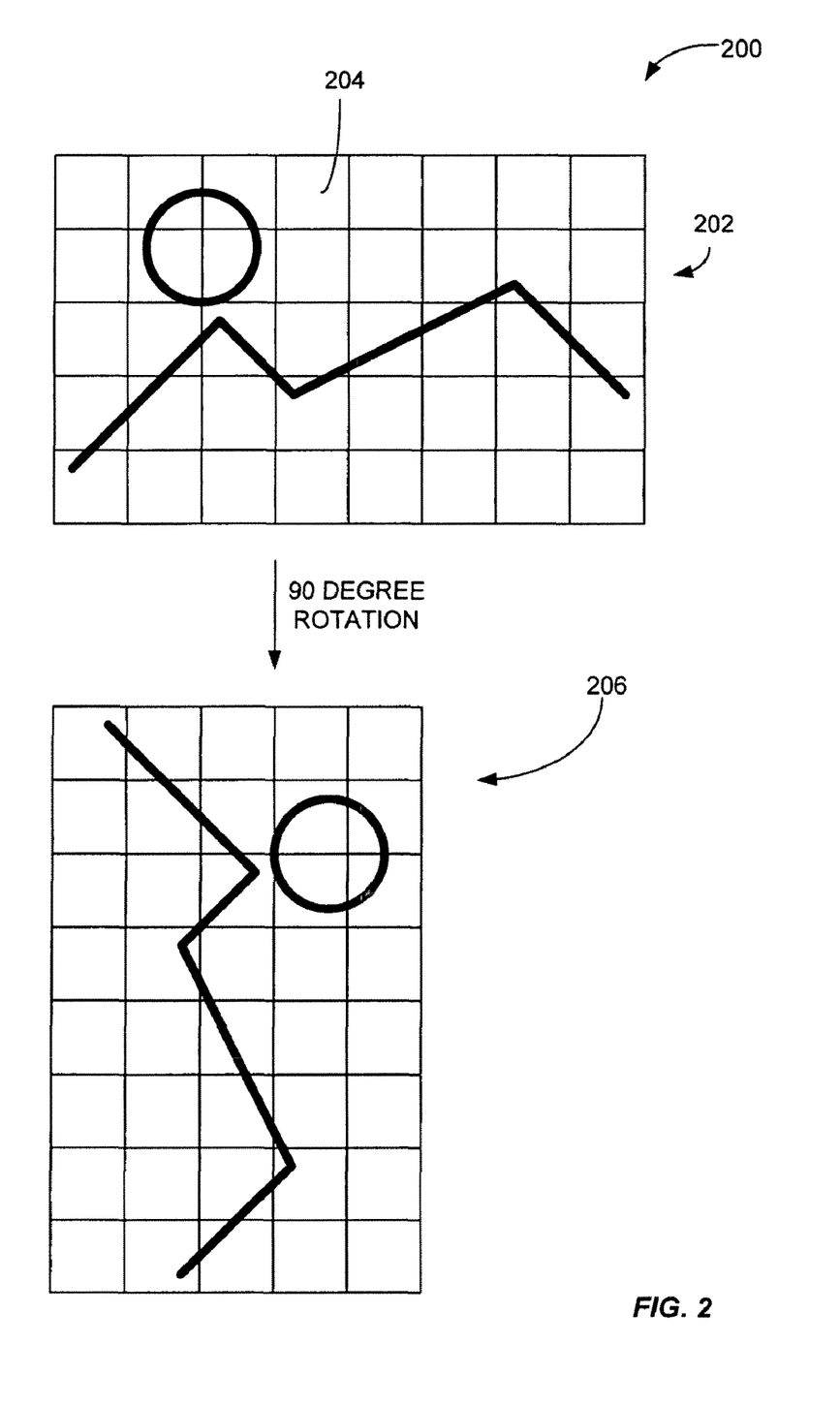
FIG. 2 is an illustration of an image having an original horizontal orientation and a rotated version of the image after a 90 degree clockwise rotation.

FIG. 2 is an illustrative diagram 200 of an image rotation process. The diagram 200 includes a source image 202 having an original orientation and a rotated image 206 that is a version of the source image that is rotated by 90-degrees clockwise relative to the original orientation. In general, the system 100 of FIG. 1 is adapted to fracture or fragment the image 202 into a plurality of source image tiles, such as source image tile 204. Each source image tile represents a matrix of image data having the same number of rows of columns of pixel information. In a particular illustrative embodiment, the matrix of image data may be a square matrix. In another particular illustrative embodiment, the matrix of image data may be a rectangular matrix. The system 100 is adapted to rotate the source image 202 by iteratively processing each source image tile using a multi-pass rotation process, wherein each pass includes at least two accesses to the external memory (e.g. a read access and a write access). Each source image tile 204 may be rotated independently from the others.

Figure 3:
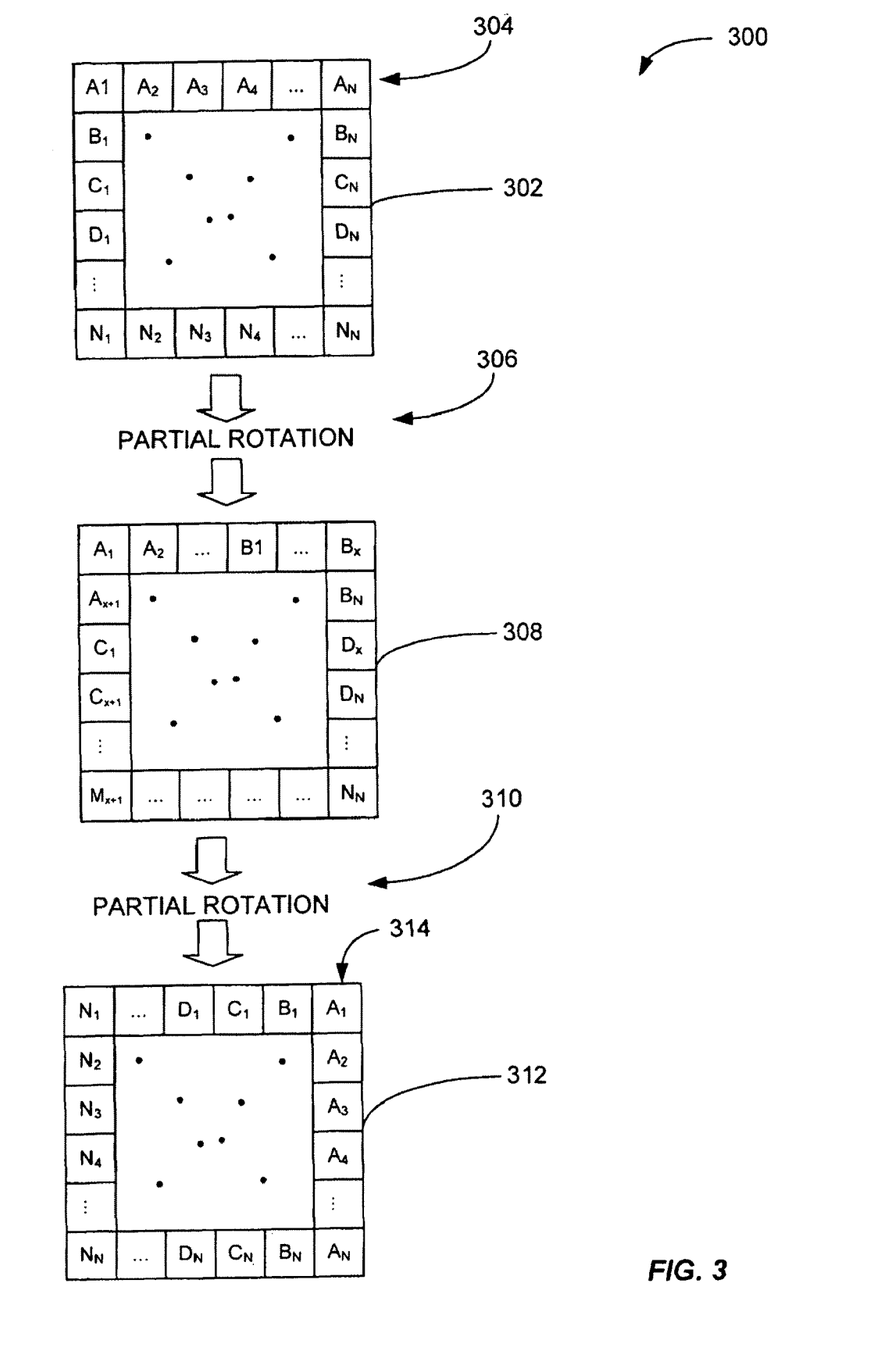
FIG. 3 is a block diagram illustrating a particular embodiment of a method of performing a multi-pass rotation of a source image tile.

FIG. 3 is a block diagram 300 illustrating a particular embodiment of a method of rotating a source image tile 302. The source image tile 302 includes a cache line or row of pixels 304. An image processor, such as the image processor 102 of FIG. 1, performs a first pass (partial rotation 306) on the source image tile 302 to produce a partially rotated image tile 308. As shown, the row of pixels 304 has been regrouped within the partially rotated image tile 308. The image processor performs a final pass (including a partial rotation 310) on the partially rotated image tile 308 to produce the rotated image tile 312, including a column 314, which corresponds to the row of pixels 304 of the source image tile 302. In general, depending on the size of the processor memory of the image processor, the particular source image tile may be rotated via a first pass, zero or more intermediate passes, and a final pass, where each pass may include one or more read/write iterations.

Figure 4:
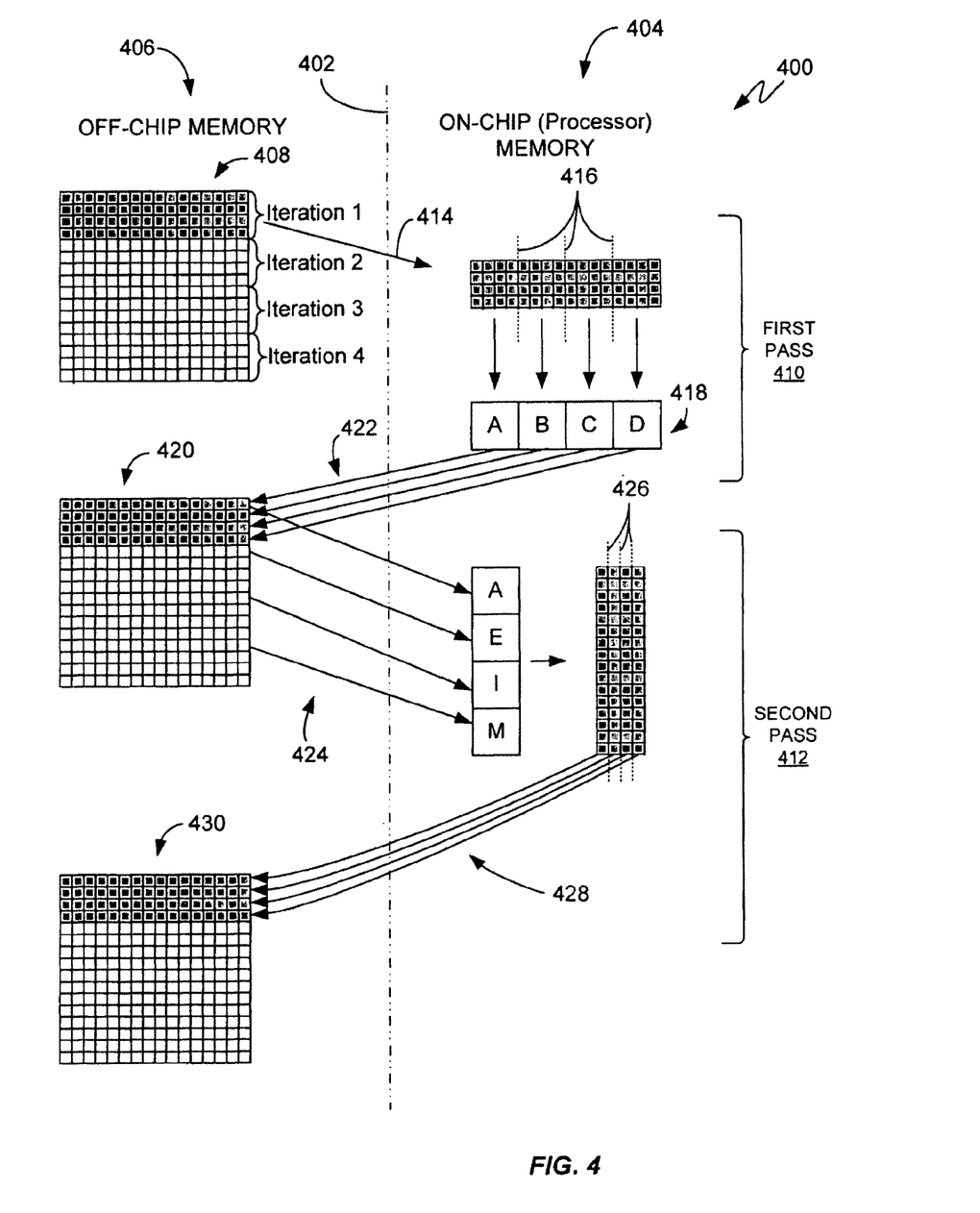
FIG. 4 is a diagram of a particular embodiment of a method of performing a multi-pass rotation of a source image tile using two passes.

FIG. 4 is a diagram 400 illustrating a method of performing a multi-pass image rotation process involving a source image tile. In general, a line 402 divides the diagram 400 between an on-chip (processor) memory 404 and an off-chip (external) memory 406. In general, a source image tile 408 is stored in the off-chip (external) memory 406. In this instance, the source image tile 408 is a 16×16 pixel source image tile (e.g. 256 pixels). The on-chip processor memory 404 is sized to store approximately 64 pixels (e.g. is ¼th the size of the source image tile). Thus, an image processor, such as the image processor 102 of FIG. 1, may process the image tile using four iterations of four read operations and four write operations for each pass of the multi-pass process (e.g. 32 cache line accesses to the off-chip memory 406 for a first pass 410 and 32 cache line accesses to the off-chip memory 406 for a second pass 412).

In a first pass 410, for each iteration, four 1×16 (1 row of 16 pixels) cache lines are read (as indicated by data transition line 414) from the source image tile 408 to the on-chip processor memory 404 via four read operations. The four cache lines are regrouped as indicated by dividing lines 416 so that each cache line holds a 4×4 block of pixels, such as the blocks A, B, C, and D, generally indicated by 418. Each 4×4 block of pixels is written to a cache line of a 256 pixel area of a temporary space 420 in the external memory 406, as indicated by data transition arrows 422. The image processor may advance to the next iteration and repeat the first pass 410 until the source image tile 408 has been processed.

In a second pass 412, for each iteration, four 4×4 cache lines are read from the temporary memory space 420 to the on-chip processor memory 404 via four read operations, as generally indicated by a data transition arrows 424 to form data blocks A, E, I, and M. For each iteration, the four 4×4 cache lines are regrouped as indicated by dividing lines 426 so that each cache line holds a 16×1 block of pixels rather than a 4×4 block of pixels. For each iteration, the regrouped cache lines are written out to the destination image location 430, as indicated by the data transition arrows 428, to form a rotated set of cache lines at the destination image location 430 in the off-chip (external) memory 406. The image processor may advance to the next iteration and repeat the second pass until each cache line of the partially rotated image tile in the temporary memory location 420 has been processed.

In general, the two-pass process utilizes four read operations and four write operations for each iteration. Moreover, the two-pass process of this particular embodiment utilizes two passes of four iterations each, which accesses the off-chip (external) memory 32 times with each pass 410 and 412 for a total of 64 memory accesses.

Figure 5:
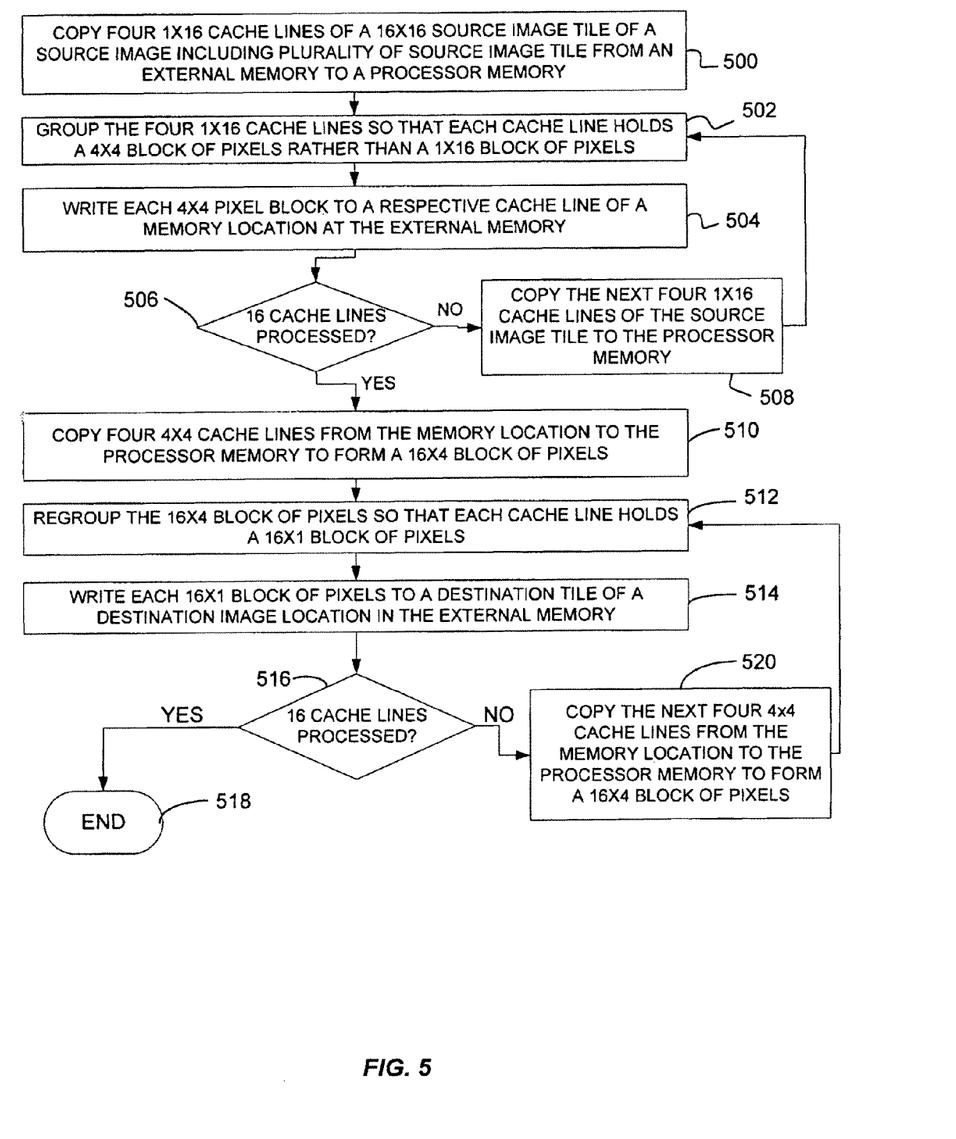
FIG. 5 is a flow diagram of a particular illustrative embodiment of a method of performing a multi-pass rotation of a source image tile.

FIG. 5 is a flow diagram of a particular illustrative method of rotating a 16×16 pixel source image tile using an image processor having a processor memory of 64 pixels (e.g. ¼th the size of the 256 pixel source image tile). Four 1×16 cache lines are copied from a 16×16 source image tile at an external memory to a processor memory, at 500. Advancing to 502, the four 1×16 cache lines are grouped so that each cache line holds a 4×4 block of pixels rather than a 1×16 block of pixels. Proceeding to 504, each 4×4 pixel block is written to a respective cache line of a memory location in the external memory. At 506, if the entire source image tile has not been processed (e.g. if less than 16 cache lines have been processed), the method advances to 508 and the next four 1×16 cache lines are copied from the source image tile. The method returns to 502.

If the entire source image tile has been processed (e.g. if 16 cache lines have been processed), four 4×4 cache lines are copied from the memory location to the processor memory form a 16×4 block of pixels at 510. Proceeding to 512, the 16×4 block of pixels is regrouped so that each cache line holds a 16×1 block of pixels. At 514, each 16×1 block of pixels is written to a cache line of a destination tile of a destination image location at the external memory. If the pixels in the memory location have been processed (e.g. if 16 cache lines have been processed) at 516, then the method is terminated at 518. Otherwise, the next four 4×4 cache lines are copied from the memory location to the processor memory to form a 16×4 block of pixels at 520, the method returns to 512, and the 16×4 block of pixels is regrouped.

it should be appreciated that the methods described with respect to FIGS. 4 and 5 are directed to rotation of a particular source image tile. However, the source image tile is generally one source image tile of a plurality of source image tiles that make up the source image. Rotation of the source image may require repeating the method of FIG. 5 for each of the plurality of source image tiles to complete the rotation of the source image. In a particular embodiment, the memory location may include a random access memory (RAM), a buffer memory of an image process, or a memory location in the external memory. In a particular embodiment, the external memory may be an off-chip memory, an on-chip memory device that is separate from a processor memory, a separate memory device, or any combination thereof.

Figure 6:
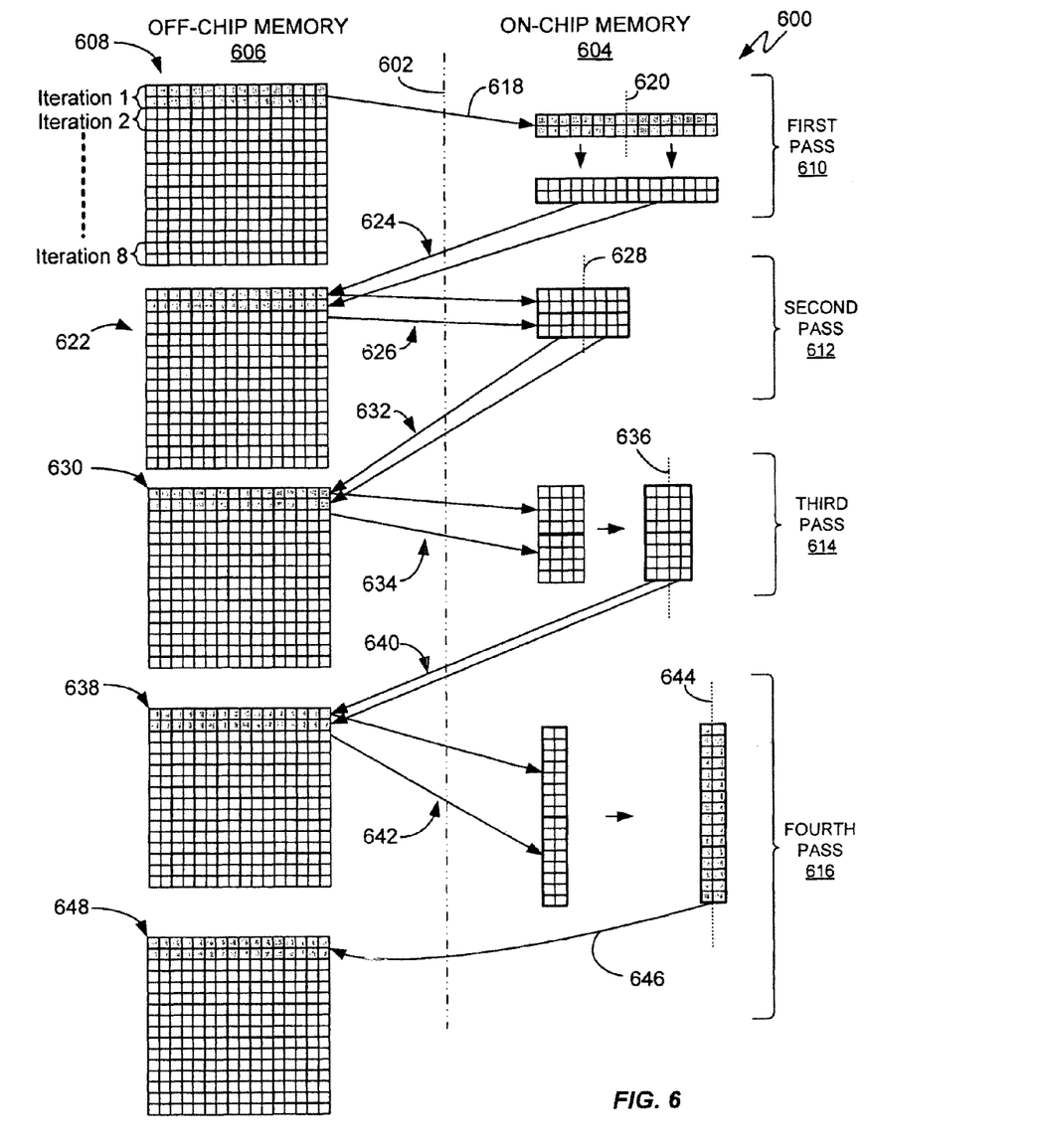
FIG. 6 is a diagram illustrating a particular illustrative embodiment of a method of performing a multi-pass rotation of a source image tile using four passes.

FIG. 6 is a diagram 600 illustrating a method of performing a multi-pass image rotation process involving a source image tile. In general, a line 602 divides the diagram 600 between an on-chip (processor) memory 604 and an off-chip (external) memory 606. A source image tile 608 is stored in the off-chip (external) memory 606. In this instance, the source image tile 608 is a 16×16 pixel source image tile (e.g. 256 pixels). The on-chip processor memory 604 is sized to store 32 pixels (e.g. is ⅛th the size of the source image tile). Thus, an image processor, such as the image processor 102 of FIG. 1, may process the image tile using eight iterations of two read operations and two write operations for each pass of the multi-pass process (e.g. 32 cache line accesses to the off-chip memory 606 for each pass).

In a first pass 610, for each iteration, two 1×16 (1 row of 16 pixels) cache lines are read (as indicated by data transition line 618) from the source image tile 608 to the on-chip processor memory 604 via two read operations. The two cache lines are regrouped as indicated by dividing line 620 so that each cache line holds a 2×8 block of pixels. Each regrouped cache line is written to a cache line of a 256 pixel area of a temporary location 622 in the external memory 606, as indicated by data transition arrows 624. The image processor may advance to the next iteration and repeat the first pass 610 until the source image tile 608 has been processed.

In a second pass 612, for each iteration, two 2×8 cache lines are read from the temporary memory location 622 to the on-chip processor memory 604 via two read operations, as generally indicated by data transition arrows 626. For each iteration, the two 2×8 cache lines are regrouped as indicated by dividing line 628 so that each cache line holds a 4×4 block of pixels rather than a 2×8 block of pixels. Each regrouped cache line is written to a cache line of a temporary memory location 630, as indicated by data transition arrows 632.

In a third pass 614, for each iteration, two 4×4 cache lines are read from the temporary memory location 630 to the on-chip processor memory 604 via two read operations, as generally indicated by data transition arrows 634. For each iteration, the two 4×4 cache lines are regrouped as indicated by dividing line 636 so that each cache line holds an 8×2 block of pixels. Each regrouped cache line is written to a cache line of a temporary memory location 638, as indicated by data transition arrows 640.

In a fourth pass (final pass) 616, for each iteration, two 8×2 cache lines are read from the temporary memory location 638 to the on-chip processor memory 604 via two read operations, as generally indicated by data transition arrows 642. For each iteration, the two 8×2 cache lines are regrouped as indicated by dividing line 644 so that each cache line holds a 16×1 block of pixels. For each iteration, each 16×1 block of pixels may be written to a destination tile of a destination image location 648 in the off-chip (external memory) 606, as indicated by data transition arrow 646.

In a first particular illustrative embodiment, the image processor may perform each pass iteratively to process the entire source tile 608 into a rotated state in the destination tile of the destination image location 648 and then repeat each of the passes 610, 612, 614, and 616 for each source image tile of a source image until the source image has been rotated. In a second particular illustrative embodiment, the image processor may perform the first pass 610 on each source image tile of the source image to produce a partially rotated image in the temporary memory before proceeding to the second pass 612. In general, the first particular illustrative embodiment may require less temporary memory space than the second particular illustrative embodiment.

In general, the four-pass process utilizes two read operations and two write operations for each iteration. Moreover, the four-pass process of this particular embodiment accesses the off-chip (external) memory 32 times with each pass for a total of 128 memory accesses. In a particular embodiment, the image processor may perform a first pass 610, zero or more intermediate passes (e.g., second pass 612 and third pass 614), and a final pass (e.g., fourth pass 614) to rotate a source image. If the image processor can rotate a source image in two passes, the intermediate passes may be omitted.

Table 1 below illustrates the scalable memory efficiency provided by the multi-pass image processor and associated methods described herein. The memory efficiency of a particular image processor may be compared by dividing a number of cache line accesses required for a particular processor memory size by the number of cache line accesses required when the processor memory size is equal to the size of the source image tile.

TABLE 1

Tile Size 16 × 16 = 256 Pixels

| | Multi-Pass System | | |
|---|---|---|---|
| Processor memory size | Cache Line Accesses | Memory Efficiency | Number of Passes |
| 256 Pixels | 32 | 100% | 1 |
| 64 Pixels | 64 | 50% | 2 |
| 32 Pixels | 128 | 25% | 4 |

Table 1 illustrates that the multi-pass system allows for processor memory size savings with relatively moderate efficiency losses.

Table 2 below illustrates the scalable efficiency provided by the multi-pass image rotation system and methods described herein for larger pixel tiles (e.g. larger cache lines).

Tile Size 256 × 256 = 65,536 Pixels

| | Multi-Pass System | | |
|---|---|---|---|
| Processor memory size | Cache Line Accesses | Memory Efficiency | Number of Passes |
| 65536 Pixels | 512 | 100% | 1 |
| 4096 Pixels | 1,024 | 50% | 2 |
| 1024 Pixels | 2,048 | 25% | 4 |
| 512 Pixels | 4,096 | 12.5% | 8 |

As shown in Table 2, for larger cache line sizes (and thus larger source image tile sizes), the multi-pass system yields significant efficiency gains. Table 2 illustrates that significant reductions in memory size relative to the tile size of the image to be rotated result in relatively moderate reductions in efficiency.

Figure 7:
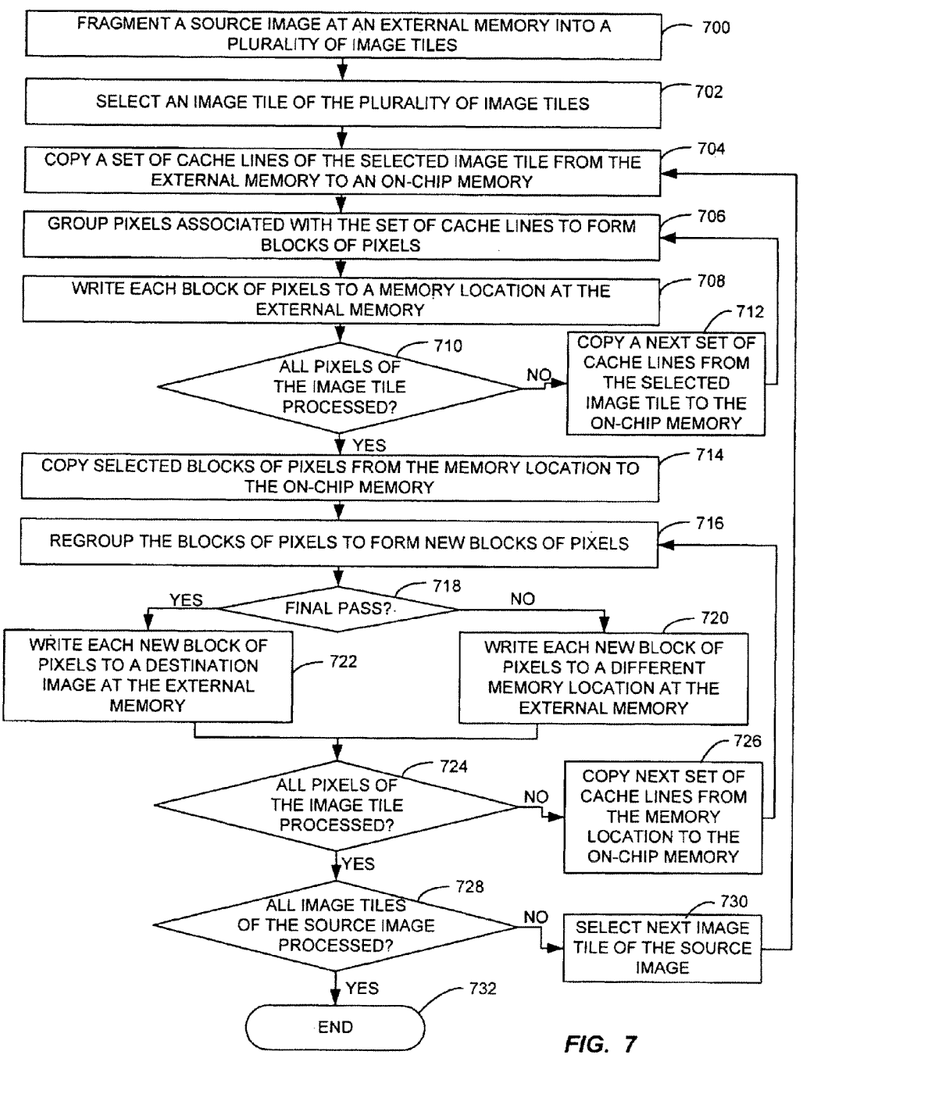
FIG. 7 is a flow diagram illustrating a particular illustrative embodiment of a method of performing a multi-pass rotation of a source image tile using a multi-pass image processor, such as that shown in FIG. 1.

FIG. 7 is a flow diagram of a general method of performing a multi-pass rotation of a source image tile. At 700, a source image at an external memory is fragmented into a plurality of tiles. In a particular embodiment, an image processor may logically fragment the source image. Moving to 702, the image processor selects an image tile of the plurality of image tiles. At 704, the image processor copies a set of cache lines of the selected image tile from the external memory to an on-chip memory. Proceeding to 706, the image processor groups pixels associated with the set of cache lines to form blocks of pixels. The image processor writes each block of pixels to a memory location at the external memory, at 708. Proceeding to 710, if all of the pixels of the selected image tile have not been processed, the method advances to 712 and the image processor reads a next set of cache lines from the selected image tile. The method advances to 706 and the image processor regroups pixels associated with the set of cache lines to form blocks of pixels.

Returning to 710, if all of the pixels of the image tile have been processed, the method advances to 714 and the image processor reads a set of cache lines from the memory location. Moving to 716, the image processor regroups pixels associated with the set of cache lines to form blocks of pixels. At 718, if this is not a final read-regroup-write pass, the method advances to 720 and the image processor writes each block of pixels to the memory location at the external memory. Otherwise, the method advances to 722 and the image processor writes each block of pixels to a destination image at the external memory. Proceeding to 724, if all of the pixels of the image tile have not been processed, the method advances to 726 and the image processor copies a next set of cache lines from the temporary memory location. The method advances to 716 and the image processor regroups pixels associated with the set of cache lines to form blocks of pixels.

Returning to 724, if all of the pixels of the image tile have been processed, the method advances to 728. At 728, if all of the image tiles of the source image have not been processed, the method advances to 730 and the image processor selects a next image tile of the source image from the external memory. The method proceeds to 704 and the image processor copies a set of cache lines of the selected image tile from the external memory to an on-chip memory. Returning to 728, if all of the image tiles of the source image have been processed, the method terminates at 732.

In general, the method described with respect to FIG. 7 performs a complete rotation operation of each image tile before processing the next image tile of a source image. In an alternative embodiment, the image processor may perform a partial rotation on the pixels of each image tile of the source image and may store the partially rotated image tiles in the temporary memory location. The image processor may then perform zero or more intermediate passes on each partially rotated image tile, where each pass includes reading cache lines from a selected tile at the temporary memory location, regrouping pixels of the cache lines, and writing the regrouped pixels to the temporary memory location. The image processor may then perform a final pass on each pixel of each of the partially rotated image tiles, including reading cache lines from the temporary memory location, regrouping pixels of the cache lines, and writing the regrouped pixels to a destination image location at the external memory. In a particular embodiment, in each of the zero or more intermediate passes, the image processor may write the regrouped pixels to a different portion of the temporary memory location. In another particular embodiment, the image processor may perform a first pass and a final pass without performing intermediate passes (e.g., zero intermediate passes), as with respect to FIG. 4.

The multi-pass image processor and associated methods described above provide an advantage in that a smaller processor memory may be employed within the image processor, without sacrificing image rotation efficiencies. The smaller processor memory may reduce the cost of an integrated circuit embodying the multi-pass image processor. Moreover, the smaller processor memory may reduce layout and routing complexity during a design process.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of rotating a digital image using a processor, the method comprising:
    performing a first pass, comprising:
        copying a set of pixels from a source memory location to a first memory location, wherein the set of pixels comprises a portion of the digital image;
        grouping the set of pixels into a block of pixels using the processor; and
        writing the block of pixels to a temporary memory location; and
    performing a second pass, comprising:
        copying at least a portion of the block of pixels from the temporary memory location to a second memory location;
        regrouping at least a portion of the block of pixels using the processor to form a regrouped block of pixels; and
        writing the regrouped block of pixels to a destination memory location, the regrouped block of pixels comprising at least of a portion of a rotated digital image.

2. The method of claim 1, wherein the set of pixels from the source memory location comprise a plurality of adjacent pixels in the digital image.

3. The method of claim 1, wherein the source memory location comprises an off-chip memory location.

4. The method of claim 1, wherein the first memory location and the second memory location are comprised in an on-chip processor memory.

5. The method of claim 1, wherein the method further comprises:
    defining a plurality of image tiles, each of the plurality of image tiles comprising a portion of the digital image; and
    performing the first pass and the second pass for each of the plurality of image tiles.

6. The method of claim 5, wherein each image tile comprises a plurality of horizontally and vertically adjacent pixels in the digital image.

7. The method of claim 1, wherein writing the regrouped blocks to a destination memory location comprises writing to a plurality of consecutive memory locations in the destination memory location.

8. A method of rotating a digital image using a processor, the method comprising:
    generating a plurality of image tiles using the processor, each image tile comprising a plurality of horizontally and vertically adjacent pixels in the digital image;
    selecting one of the plurality of image tiles;
    performing a first pass, comprising:
        copying at least a first row of pixels and a second row of pixels from the selected image tile;
        grouping at least a portion of pixels from the first row of pixels and the second row of pixels into a matrix of pixels;
        writing the block of pixels to a temporary memory location;
    performing a second pass, comprising:
        copying the block of pixels from the temporary memory location;
        regrouping the selected blocks to form a portion of the rotated image;
        writing the regrouped blocks to a destination memory location; and
    successively selecting each of the plurality of image tiles and performing the first pass and the second pass to generate a rotated digital image.

9. A method of claim 8, wherein regrouping the selected blocks to form the portion of the rotated image further comprises regrouping adjacent pixels in the rotated digital image.

10. The method of claim 8, wherein writing the regrouped blocks to a destination memory location comprises writing to a plurality of consecutive memory locations in the destination memory location.

11. A system, comprising:
    a processor configured to perform:
        a first pass to copy a set of pixels of a digital image from a source memory location to a first memory location, wherein the set of pixels comprises a portion of the digital image, to group the set of pixels into a block of pixels, to write the block of pixels to a temporary memory location; and
        a second pass to copy at least a portion of the block of pixels from the temporary memory location to a second memory location, to regroup at least a portion of the block of pixels to form a regrouped block of pixels, and to write the regrouped block of pixels to a destination memory location, the regrouped block of pixels comprising at least a portion of a rotated digital image.

12. The system of claim 11, further comprising an on-chip processor memory, and wherein the processor memory comprises the first memory location and the second memory location.

13. The system of claim 11, further comprising an off-chip memory, and wherein the off-chip memory comprises the source memory location and the destination memory location.

14. The system of claim 13, wherein the off-chip memory further comprises the temporary memory location.

15. The system of claim 11, wherein the regrouped blocks are written to consecutive memory locations in the destination memory location.

16. The system of claim 11, wherein the processor is further configured to define a plurality of image tiles, each of the plurality of image times comprising a portion of the digital image and to perform the first pass and the second pass for each of the plurality of image tiles.

17. A non-transitory processor-readable medium comprising program code for causing a processor to perform a method to rotate a source digital image, the method comprising:
   performing a first pass, comprising:
      copying a set of pixels from a source memory location to a first memory location, wherein the set of pixels comprises a portion of the source digital image;
      grouping the set of pixels into a block of pixels using the processor; and
      writing the block of pixels to a temporary memory location; and performing a second pass, comprising:
      copying at least a portion of the block of pixels from the temporary memory location to a second memory location;
      regrouping at least a portion of the block of pixels using the processor to form a regrouped block of pixels; and
      writing the regrouped block of pixels to a destination memory location, the regrouped block of pixels comprising at least of a portion of a rotated digital image.

18. The non-transitory processor-readable medium of claim 17, wherein the set of pixels from the source memory location comprise a plurality of adjacent pixels in the digital image.

19. The non-transitory processor-readable medium of claim 17, wherein the source memory location comprises an off-chip memory location.

20. The non-transitory processor-readable medium of claim 17, wherein the first memory location and the second memory location are comprised in an on-chip processor memory.

21. The non-transitory processor-readable medium of claim 17, further comprising program code for causing the processor to perform a method, comprising:
   defining a plurality of image tiles comprising a portion of the digital image; and
   performing the first pass and the second pass for each of the plurality of image tiles.

22. The non-transitory processor-readable medium of claim 17, wherein each image tile comprises a plurality of horizontally and vertically adjacent pixels in the digital image.

23. The non-transitory processor-readable medium of claim 17, wherein the regrouped blocks are written to a plurality of consecutive memory locations in the destination memory location.

* * * * *